(12) United States Patent
Flores et al.

(10) Patent No.: US 8,943,518 B2
(45) Date of Patent: Jan. 27, 2015

(54) MANAGING AND OPTIMIZING WORKFLOWS AMONG COMPUTER APPLICATIONS

(71) Applicant: International Business Machines Corporation, Armonk, NY (US)

(72) Inventors: Romelia H. Flores, Keller, TX (US); Charlet N. Givens, Dallas, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/856,027

(22) Filed: Apr. 3, 2013

(65) Prior Publication Data

US 2013/0227590 A1 Aug. 29, 2013

Related U.S. Application Data

(63) Continuation of application No. 12/839,841, filed on Jul. 20, 2010, now Pat. No. 8,458,729.

(51) Int. Cl.
*G06F 3/00* (2006.01)
*G06F 9/44* (2006.01)
*G06F 9/46* (2006.01)
*G06F 13/00* (2006.01)
*G06Q 10/06* (2012.01)
*G06Q 10/10* (2012.01)

(52) U.S. Cl.
CPC ....... *G06F 9/46* (2013.01); *G06Q 10/06* (2013.01); *G06Q 10/103* (2013.01)
USPC .......................................... 719/313; 719/318

(58) Field of Classification Search
None
See application file for complete search history.

(56) References Cited

U.S. PATENT DOCUMENTS

| 6,157,934 | A | 12/2000 | Khan et al. |
| 7,299,244 | B2 * | 11/2007 | Hertling et al. ............... 707/694 |
| 2006/0008524 | A1 | 1/2006 | Chen et al. |
| 2006/0085245 | A1 | 4/2006 | Takatsuka et al. |
| 2007/0101179 | A1 | 5/2007 | Chafle et al. |
| 2007/0106541 | A1 | 5/2007 | Raisanen |

(Continued)

FOREIGN PATENT DOCUMENTS

EP 1696378 A1 8/2006

OTHER PUBLICATIONS

Patent Cooperation Treaty, PCT International Search Report and Written Opinion of the International Searching Authority, for PCT/EP2011/062358 dated Sep. 27, 2011, 9 pages.
Dorais, Office Action Communication for U.S. Appl. No. 12/839,841 dated Sep. 11, 2012, 20 pages.

(Continued)

*Primary Examiner* — Craig Dorais
(74) *Attorney, Agent, or Firm* — Jean M. Sullivan; Hoffman Warnick LLC

(57) ABSTRACT

A middleware system, method and program product for managing workflows among computer applications. The middleware system includes: a common construct unit and a workflow export unit. The common construct unit (i) retrieves a mapping between a component of a macro workflow of the middleware system and a micro workflow component of a first computer application and (ii) executes the macro workflow which orchestrates micro workflows of the first computer application and a second computer application. The workflow export unit generates an output that enables the second computer application to execute a workflow that corresponds to the workflow of the first computer application.

19 Claims, 7 Drawing Sheets

(56) References Cited

U.S. PATENT DOCUMENTS

2007/0143736 A1    6/2007  Moriarty et al.
2008/0021696 A1*   1/2008  Bartelt et al. .................... 703/27
2008/0065648 A1*   3/2008  Gupta et al. .................... 707/10
2009/0150900 A1*   6/2009  Kowalkiewicz et al. ...... 718/106
2010/0057826 A1    3/2010  Chow et al.

OTHER PUBLICATIONS

Dorais, Notice of Allowance and Fee(s) Due for U.S. Appl. No. 12/839,841 dated Feb. 5, 2013, 13 pages.

Patent Cooperation Treaty, PCT International Preliminary Report on Patentability, for PCT/EP2011/062358 dated Jan. 22, 2013, 5 pages.

* cited by examiner

MANAGING AND OPTIMIZING WORKFLOWS AMONG COMPUTER APPLICATIONS

CROSS-REFERENCE TO RELATED APPLICATIONS

The present invention is a continuation application and claims priority to co-pending U.S. patent application Ser. No. 12/839,841 filed on Jul. 20, 2010, entitled "MANAGING AND OPTIMIZING WORKFLOW AMONG COMPUTER APPLICATIONS," the content of which is hereby incorporated by reference.

BACKGROUND OF THE INVENTION

1. Field of the Invention

The present invention relates to applications development and integration platforms. More particularly, the present invention relates to a computer-implemented system, method, and computer readable article that manages workflows among middleware and computer applications.

2. Description of the Related Art

A business or organizational process is the collection of steps or workflow taking place in a prescribed manner and leading to an organizational objective. The steps of an organizational process can be executed by an application server system or by a user. The following three types of components exist to support the organizational processes: 1) Definition—enables an organizational analyst or developer to define or modify the organizational process workflow or steps; 2) Execution—enables a developer or system analyst to begin or start an application process engine or system execution of a workflow or organizational process steps; 3) Monitor—provides a view of which processes and steps have been executed and their performance.

Given the service oriented architecture (SOA) paradigm of application development, most application systems (Rhapsody, FileNet, Siebel, Curam, etc.) provide the ability to define, execute and in some cases monitor workflows created within such application systems. Workflows that are specific to a particular application system or component of an application system are called micro workflows. In addition, business process management (BPM) software such as IBM WebSphere Process Server or Oracle Business Process Management enable the orchestration of steps or workflows via web services to various application systems. This orchestration enables the integration of processing and data among the various application systems. Workflows that span multiple application systems are called macro workflows.

A typical SOA application executes both macro and micro workflows to accomplish a particular function or goal. The definition, execution and monitoring of workflows to support these SOA environments typically resides and is performed using various application server systems as well as the middleware software.

Currently, there is no single middleware platform available to define and choreograph workflows and export these workflows to third party application server process engines at both a macro and micro level. For instance, existing application systems require definitions to be defined on multiple tools provided by that particular vendor. Similarly, there is no runtime tool that monitors the steps of the workflows across the various application servers.

The inability to have a single platform define, execute and monitor workflows across various application systems creates limitations. Developers have to learn multiple workflow tools and create and maintain these workflow definitions in various tools. For execution, multiple workflow engines will need to be made available to execute the steps for their application server environment. For monitoring current systems, an analyst or developer will need to use the various application server tools to drive, debug and monitor performance of workflows and the individual steps within the workflows.

Therefore, what is needed is a single design platform or a single middleware system that provides a centralized place for analysts or developers to create and maintain both macro and micro workflow definitions.

SUMMARY OF THE INVENTION

According to one aspect of the present invention, a middleware system for managing workflows among computer applications includes: a common construct unit and a workflow export unit.

The common construct unit retrieves a mapping between a component of a workflow of a macro workflow of the middleware system and a micro workflow component of a first computer application. The common construct executes the macro workflow which orchestrates micro workflows of the first computer application and a second computer application. The workflow export unit generates an output that enables the common construct unit to execute the macro workflow which orchestrates the micro workflows on the first or second computer application.

According to still another aspect of the present invention, a computer-implemented method of managing workflows among computer applications includes: retrieving a mapping between a component of a macro workflow of a middleware system and a micro workflow component of a first computer application, where the macro workflow is capable of orchestrating micro workflows of the first computer application and a second computer application; and generating an output that enables a common construct of the middleware system to execute the macro workflow which orchestrates the micro workflows on the first or second computer application.

According to yet another aspect of the present invention, a computer program product is provided for managing workflows among computer applications. The computer program product includes computer program instructions stored on a computer readable storage medium. When the instructions are executed, a computer will perform the steps of the method.

DETAILED DESCRIPTION OF PREFERRED EMBODIMENTS

It will be readily understood that embodiments of the present invention, as generally described and illustrated in the figures herein, may be arranged and designed in a wide variety of different configurations in addition to the described preferred embodiments. Thus, the following detailed description of the embodiments of the present invention, as represented in the figures, is not intended to limit the scope of the invention, as claimed, but is merely representative of selected preferred embodiments of the invention. The following description is intended only by way of example, and illustrates certain selected preferred embodiments of the invention as claimed herein.

Figure 1:
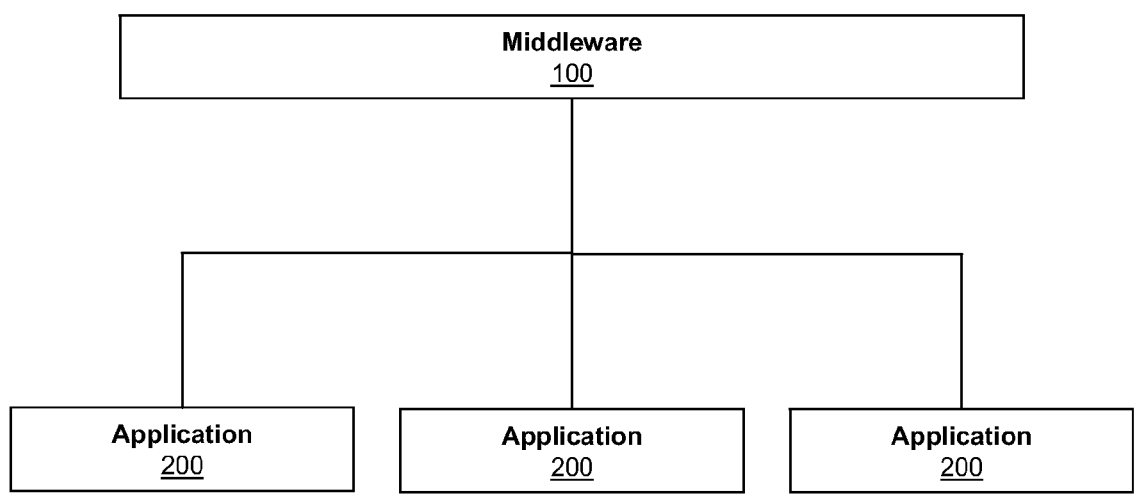
FIG. 1 is a block diagram that illustrates a middleware system for managing workflows among computer applications according to one embodiment of the present invention.

According to one embodiment of the present invention, a middleware system is provided for managing workflows among computer applications. Referring to FIG. 1, a block diagram illustrates the middleware system 100 for managing workflows among computer applications 200.

The single middleware system 100 provides a centralized place for users to create and maintain both macro and micro workflow definitions. As described above, a micro workflow is a step or a series of steps to be performed by the computer application 200 and a macro workflow is a step or a series of steps enabling a connection between a middleware system 100 and a computer application 200. An example of a micro workflow may be sending an email while an example of a macro workflow may be generating a report, which could involve sending an email using a certain computer application, retrieving the email using another computer application, and printing the contents of the email using yet a different computer application.

The workflows can be exported with the appropriate workflow components, such as business objects or function calls, and can therefore be made available to the middleware server. The computer application 200 may be, for example, a third party application such as SAP, Siebel, Oracle, etc., or it can also be another middleware system.

The middleware system 100 can dynamically change the workflow components, thus orchestrating the micro workflow processing. This provides the ability from the middleware system macro workflow to easily modify which micro work flows and application systems are utilized by the macro flow middleware system. As an example, for file management systems, content management may be swapped with FileNet. For CRM systems, Siebel may be swapped with SAP. A rules engine may be included as part of the middleware system 100 to enable the intelligent execution of rules for selection of appropriate micro workflow application systems. Using XML or other workflow languages, external rules or rules of the various computer applications 200 may be used to set policies, change a macro or micro workflow to a different runtime, and change the overall macro workflow dynamically. The ability of the middleware system 100 to export workflows and target specific application server software environments of the various computer applications 200 will be described in detail below.

Figure 2:
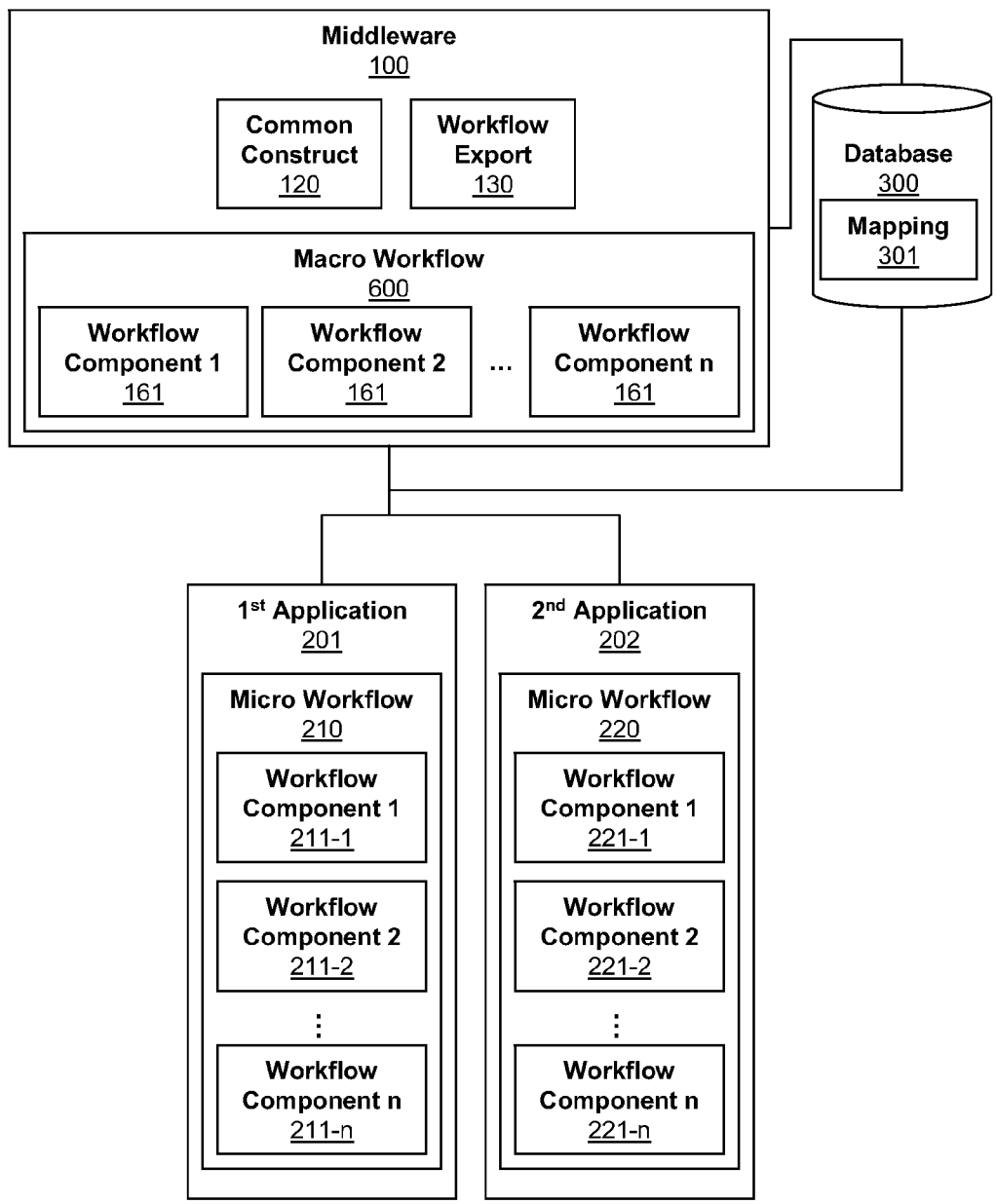
FIG. 2 is a block diagram that illustrates the details of the middleware system.

The middleware system 100 includes a common construct unit and a workflow export unit. Referring to FIG. 2, a block diagram illustrates the details of the middleware system 100 to include a common construct unit 120 and a workflow export unit 130.

After the system 100 receives a request to execute a workflow 210 from a first computer application 201, the workflow export unit 130 determines which workflow component(s) 211-1, 211-2, ..., 211-$n$ are used in the workflow 210. This determination can be made by referencing the workflow component(s) 211, which may be stored in the database 300. Additionally, user or other external input may be provided as to how the workflow 210 is constructed. The common construct unit 120 retrieves a mapping 301 between a component 161 of a macro workflow 600 of the middleware system 100 and the component(s) 211-1, 211-2, ..., 211-$n$ of the micro workflow 210 of the first computer application 201. As mentioned above, examples of a workflow component may be a business object or a function call. The macro workflow 600 is capable of orchestrating the micro workflows of the first computer application 201 and any other computer applications that may be connected to the middleware system 100, such as a second computer application 202 shown in FIG. 2. If multiple computer applications are connected, the system 100 may also receive requests to execute workflows from these other computer applications.

A business object is a code construct that corresponds to a thing in the actual organization or business. It encapsulates the logic related to the thing as well as the data that is required by the logic. A business object can also include metadata, i.e., information that describes, defines, makes up, is contained by, and or is associated with the thing. Examples of business objects may be a customer, a customer's contact information, a customer service representative, or a business phone number. A function call is a call to a code or a portion of code which performs a specific task. Examples of function calls may be calls to send an email or to send a file to a printer.

The middleware system 100 and the first computer application 201 may support different application types, that is, each application may retrieve or recognize input and/or produce output in different languages or formats. In addition, if multiple computer applications are connected to the middleware system and/or the first computer application, such as the second computer application 202, the second computer application 202 may also support an application type that is different from the middleware system 100 and/or the first computer application 201. As such, a mapping is performed between a component of a workflow of one computer application or middleware system and a workflow component of another computer application. The mapping may be a 1:1, 1:N, or N:1 mapping. Example mappings are shown in the table below:

TABLE 1

| | Middleware Server | 1$^{st}$ Application |
|---|---|---|
| Component 1 | CSR | Service Representative |
| Component 2 | Send Email | Step 1. Transmit email file from a Message User Agent (MUA) to a Message Submission Agent (MSA) Step 2. MSA sends email file to a Mail Transfer Agent (MTA) Step 3. MTA looks up the destination's mail exchanger record Step 4. MTA sends email file to a server on record |

In Table 1, the workflow components of the middleware server macro workflow are mapped to the respective workflow components of the 1$^{st}$ Application. The business object, CSR, which is a workflow component of the middleware server, is mapped to a business object, Service Representative, a workflow component of the $1^{st}$ Application. The function call, Send Email, another workflow component of the middleware server, is mapped to steps 1-4, which could be either a single workflow component or several workflow components of the $1^{st}$ Application or another application server.

Retrieving a mapping may be performed by referencing a table or by using software library lookups or state machines, etc. In FIG. 2, the mapping 301 may be stored in a database 300 that is connected to the middleware system 100. The workflows 210, 220 used by the various computer applications as well as the workflow components 211-1, 211-2, . . . , 211-*n*, 220-1, 220-2, . . . , 220-*n* may also be stored in this database 300. Existing techniques may be used to import new third party application workflows and the mappings between these workflows.

Figure 3A:
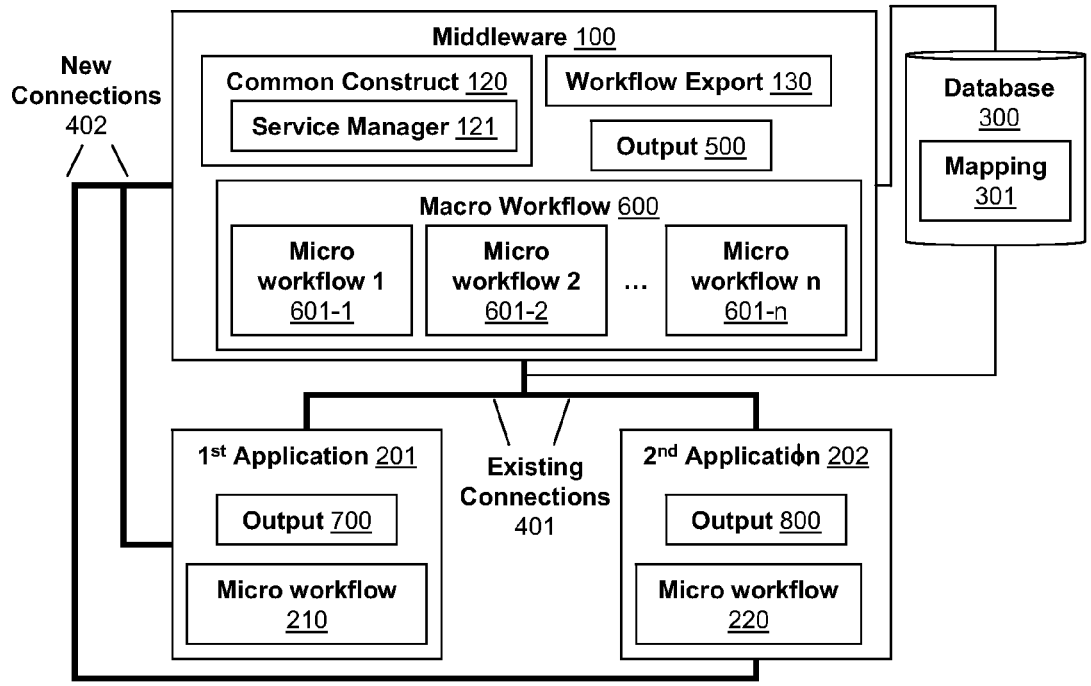
FIG. 3A is a block diagram that illustrates a common construct unit of the middleware system.

Referring to FIG. 3A, the common construct 120 unit includes a service manager unit 121. The service manager unit 121 tests current connections 401 between the middleware system 100 and the computer applications 201, 202 or creates a new connection 402 to the computer applications 201, 202. This service manager unit 121 provides the support for connector units for the servers of the computer applications 201, 202. There are various handlers associated with the connectors. Different connectors are associated with various back end sources. The connector to connector relationship is a 1:N relationship. N connectors may be attached to the external connectors. The handler can be a custom or data handler. The connector initializes and invokes the back end source and retrieves an output 500 that is generated by the workflow export unit 130 of the middleware system 100. The existing or new connection 401, 402 enables the middleware system 100 to retrieve or apply the generated output 500. These connections may utilize any message protocol such as TCP/IP, HTTP, SOAP, etc.

The output 500 that is generated by the workflow export unit 130 enables the common construct 120 of the middleware system 100 to execute the macro workflow 600 that may contain various micro workflow steps 601-1, 601-2, . . . , 601-*n*. These micro workflow steps 601-1, 601-2, . . . , 601-*n* are based on the mapped components 161 (from FIG. 2) of the macro workflow 600. After the mapping 301 has been retrieved, the workflow export unit 130 will look up or refer to the mapping 301 between the macro workflow component 161 (from FIG. 2) of the middleware server 100 and the workflow component(s) of either the $1^{st}$, $2^{nd}$, or Nth computer application. Thereafter, the workflow export unit 130 will retrieve, from the mapping 301, the micro workflow components corresponding to micro workflows in the $1^{st}$, $2^{nd}$ or Nth application servers. The output 500 may be a standard language file such as XML, a proprietary language file, a text file, or an API call, etc. When it is sent to the application server software environment of the second computer application 202, the second computer application 202 will be able to execute a workflow 600 that corresponds to multiple workflow steps 600-1, 600-2, . . . , 600-*n*. The workflow export unit 130 can also generate outputs 700, 800 for the first and second applications 201, 202, respectively, that enables the middleware system 100 to execute the micro workflows of these applications 201, 202.

Figure 3B:
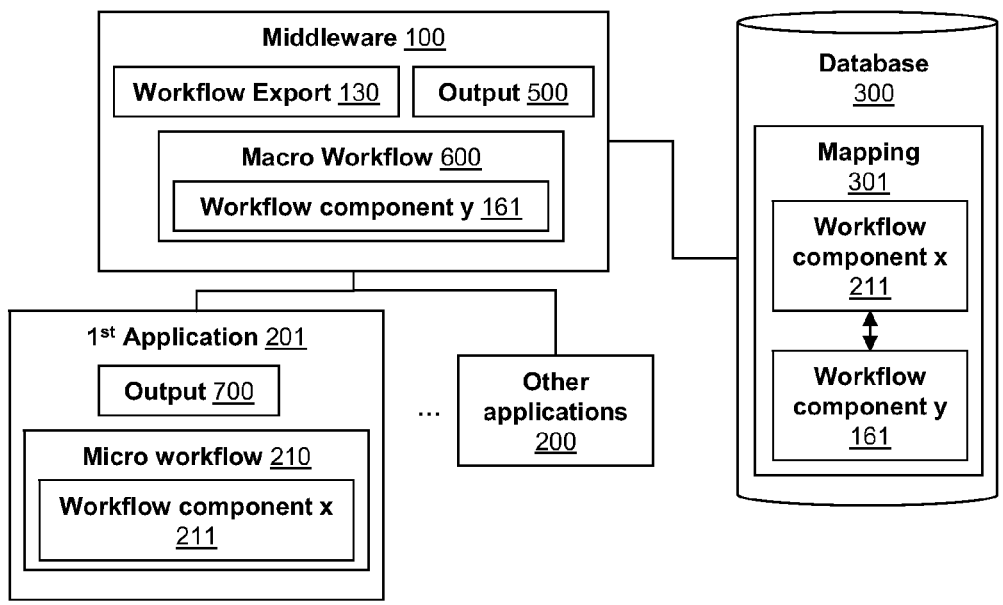
FIG. 3B is a block diagram that illustrates an example how the workflow export unit of the middleware system interacts with the computer applications and utilizes information stored in a database to generate an output.

FIG. 3B illustrates an example of how the workflow export unit 130 interacts with the first computer application 201 and utilizes information stored in the database 300 to generate the output 500. If that workflow component x 211, which is a component of the workflow 210 of the first computer application 201, is desired in generating the output 500, the workflow export unit 130 will look up the mapping 301 between workflow component x 211 and the corresponding macro workflow component 161. The workflow export unit 130 will then retrieve, from the mapping 301, workflow component y 161, and use workflow component y 161 to generate the output 500.

The following are example outputs constructed by the workflow export unit.

EXAMPLE 1

```
<xml>
<Host>
<target>
<primitives>
<components>
<comp1>
:
:
</comp1>
<comp2>
:
</comp2>
</components>
<operation>
<data>
<events>
</xml>
```

EXAMPLE 2

```
<Customer Contact>
<CSR>
<Contact Type>
<Business Phone#>
<Cell Phone#>
```

EXAMPLE 3

```
<Transmit email file from a Message User Agent to a Message Submission Agent>
<MSA sends email file to a Mail Transfer Agent>
<MTA looks up the destination's mail exchanger record>
<MTA sends email file to a server on record>
```

Examples 1 and 2 are sample outputs in XML format. Example 1 shows a more generic example of the workflow components while example 2 shows a more specific example. Example 3 is an example pseudocode for the Send Email component shown in Table 1. The actual output for example 3 is in a format that is recognizable by the $1^{st}$ Application.

Additionally, the database 300 may also contain the workflow export status that contains a date/timestamp of a workflow and which computer application that workflow was distributed to. The workflow export status may be retrieved by other units that support the middleware system 100.

Figure 4:
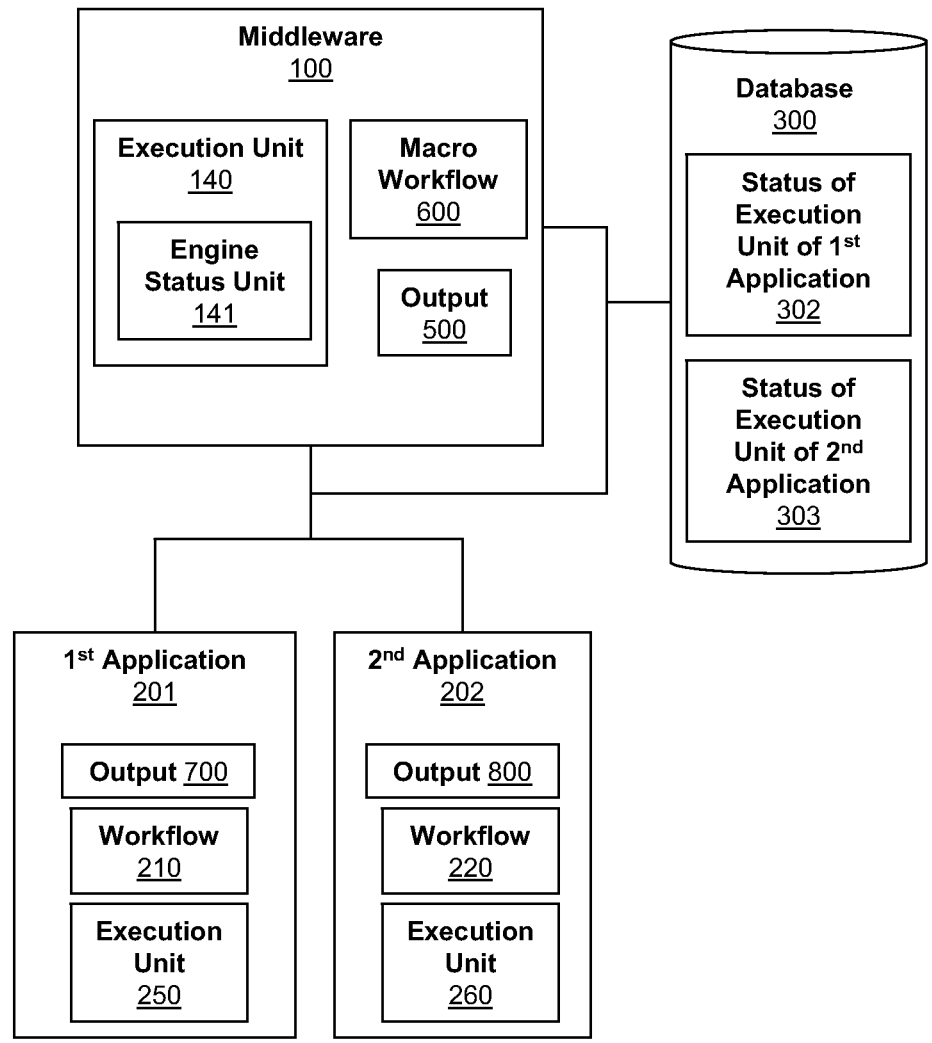
FIG. 4 is a block diagram that illustrates an execution unit of the middleware system.

Referring to FIG. 4, the middleware system 100 may include an execution unit 140 that executes the macro workflow 600 or the corresponding workflow(s) on the first or second computer applications 201, 202. Referring to example 3 above, if the generated output 500 is code that corresponds to the pseudocode shown above, then the middleware system 100 will execute the code on the $1^{st}$ Application (see Table 1), thus performing the Send Email workflow (or the Send Email component of a workflow.)

The execution unit 140 of the middleware system 100 collaborates with the execution units 250, 260 of the computer applications 201, 202, i.e., the execution units 250, 260 of the computer applications 201, 202 has the ability to notify the middleware system 100 of whether the computer application execution units 250, 260 are in operation and the execution unit 140 of the middleware system 100 has the ability to test the availability of the application server environments of the computer applications 201, 202.

The execution unit 140 of the middleware system 100 may include an engine status unit 141 that retrieves the status information 302, 303 of the application software environment from each of the execution units 250, 260 for the computer applications 201, 202. The status information 302, 303 of the execution units for the computer applications 201, 202 may be stored in the database 300. If the execution unit of a particular computer application requires startup, the command to do this may also be stored in the database 300.

Figure 5:
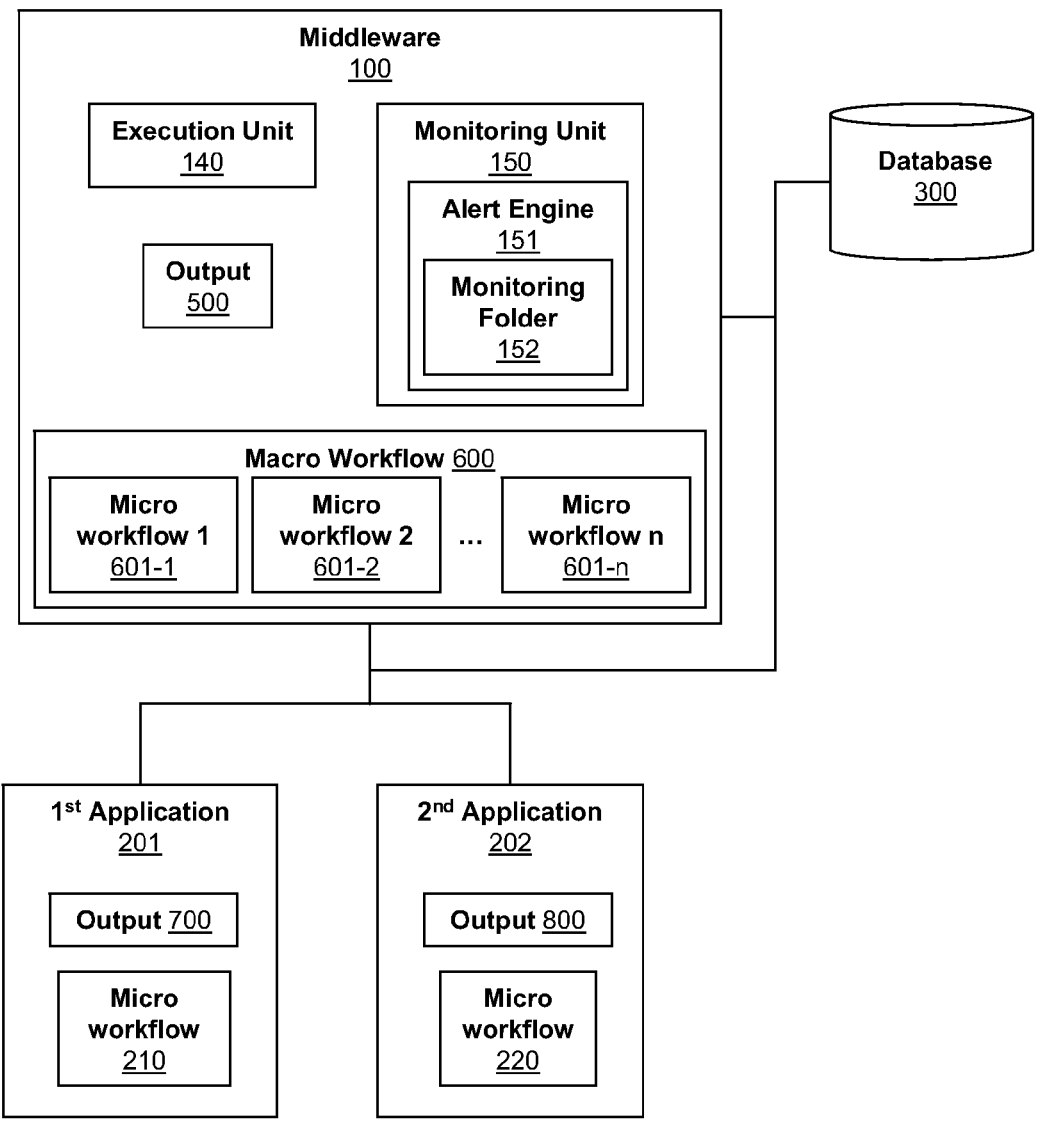
FIG. 5 is a block diagram that illustrates a monitoring unit of the middleware system.

Referring to FIG. 5, the middleware system 100 may also include a centralized monitoring unit 150 to monitor, at both the macro and the micro levels, the workflows that are executable by both the middleware system 100 and computer applications 201, 202. The monitoring unit 150 can drastically reduce the time and cost in the implementation and ongoing maintenance of the implementation of the monitoring process.

One such implementation approach for this monitoring unit is a "watchdog" approach. The monitoring unit 150 includes an alert engine 151 that obtains information about the latest status of specific workflow steps. The alert engine 151 acts as a "watchdog," which runs while the execution unit 140 of the middleware system 100 executes, for example, the workflow 600 to identify the specific workflow components or steps to be executed and to show the current execution status of the workflow 600. Monitoring techniques like checkpoint and grid computing may also be implemented by the monitoring unit 150. A common monitoring folder 152 may be included as part of the alert engine 151. This folder 152 can be used to store or access the output 500. Obtaining the status of the execution of the micro workflow(s) corresponding to the macro workflow can be performed by retrieving the output 500 from the folder 152, parsing the output to generate runtime information related to the components of the micro workflows 601-1, 601-2, . . . 601-$n$ being executed.

Embodiments of the present invention may utilize open standards, such as the BPEL4WS and WS Choreography standards, or may incorporate the use of open standards through third party applications.

Figure 6:
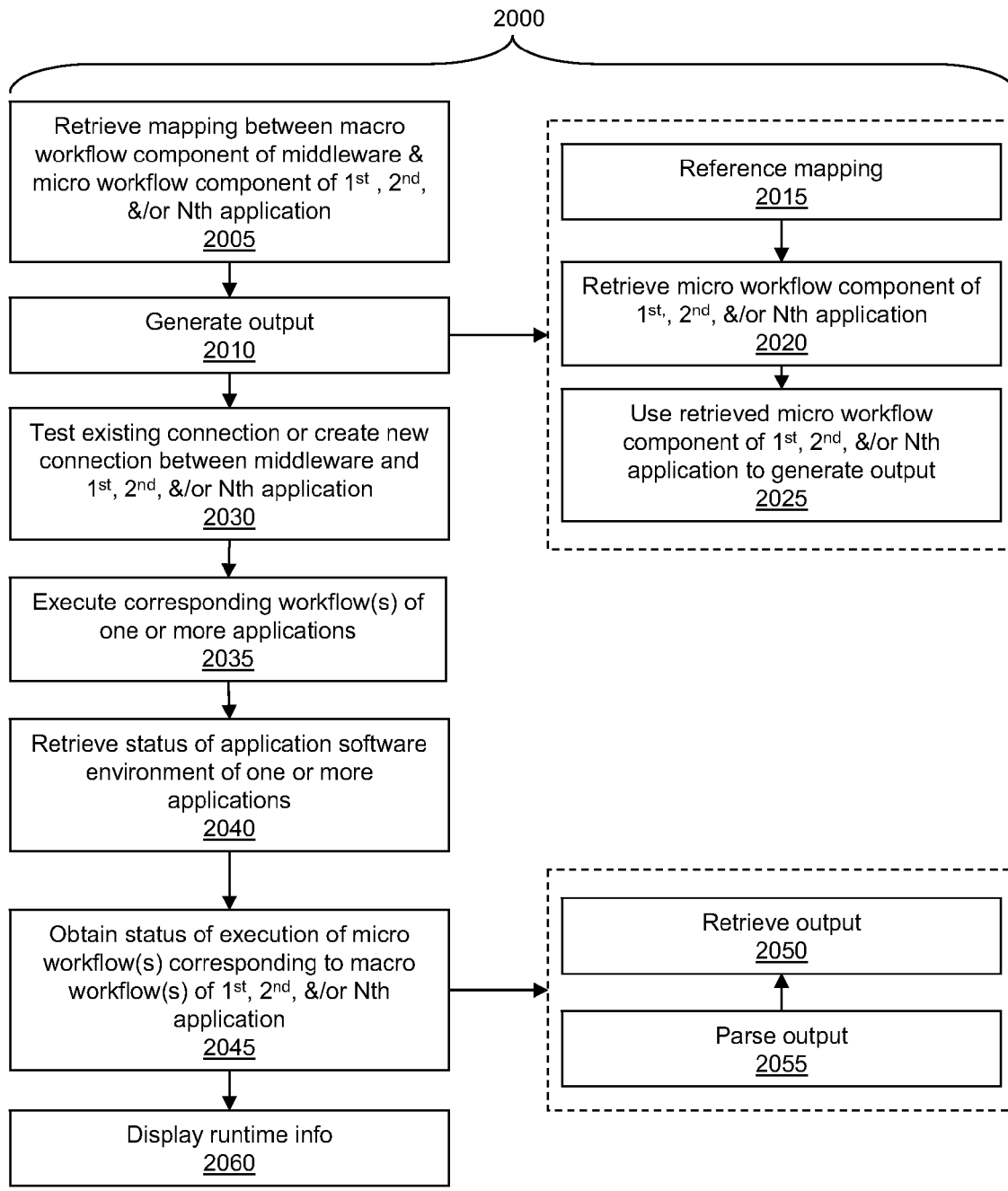
FIG. 6 is a flow chart that illustrates the computer-implemented method of managing workflows among computer applications according to another embodiment of the present invention.

According to another embodiment of the present invention, a computer-implemented method is provided for managing workflows among computer applications. Referring to FIG. 6, a flow chart illustrates an exemplary method 2000.

The method 2000 starts at block 2005 by retrieving a mapping between a component of a macro workflow of a middleware system and a micro workflow component of the first computer application. A mapping between the macro workflow component of the middleware system and a micro workflow component of other computer applications that may be connected to the middleware system or the first computer application can also be retrieved. The macro workflow is capable of orchestrating the micro workflows of the first computer application and other computer applications that may be connected to the middleware system. At block 2010, an output is generated that enables a common construct of the middleware system to execute the macro workflow on the first computer application or on the second computer application.

Details of the step of generating the output are illustrated as sub-steps in blocks 2015, 2020, and 2025. The sub-steps include: referencing the mapping between the component of the macro workflow of the middleware system and the micro workflow component of the $1^{st}$, $2^{nd}$, and/or Nth computer application at block 2015; retrieving the micro workflow component of the $1^{st}$, $2^{nd}$, and/or Nth computer application that corresponds to the macro workflow component of the middleware system at block 2020; and using the retrieved micro workflow component of the $1^{st}$, $2^{nd}$, and/or Nth computer application to generate the output at block 2025.

At block 2030, the method may further include the step of testing an existing connection between the middleware system and the $1^{st}$, $2^{nd}$ or Nth computer application or creating a new connection between the middleware server and the $1^{st}$, $2^{nd}$ and/or Nth computer application. The existing or new connection enables the middleware system to retrieve or apply the generated output.

At block 2035, the method may also include the step of executing the corresponding workflow(s) of the $1^{st}$, $2^{nd}$ and/or Nth computer application.

At block 2040, the status of the application software environment of one or more computer applications is retrieved.

At block 2045, the method may further include the step of obtaining the status of the execution of the micro workflow(s) corresponding to the macro workflow(s) of the $1^{st}$, $2^{nd}$, or Nth application. Details of this step are illustrated as sub-steps in blocks 2050 and 2055. The sub-steps include: retrieving the output from a common monitoring folder of the middleware system at block 2050 and parsing the output to generate runtime information about the component of the micro workflow that corresponds to the macro workflow of the middleware system at block 2055. At block 2060, the method may also include the step of displaying the generated runtime information.

Figure 7:
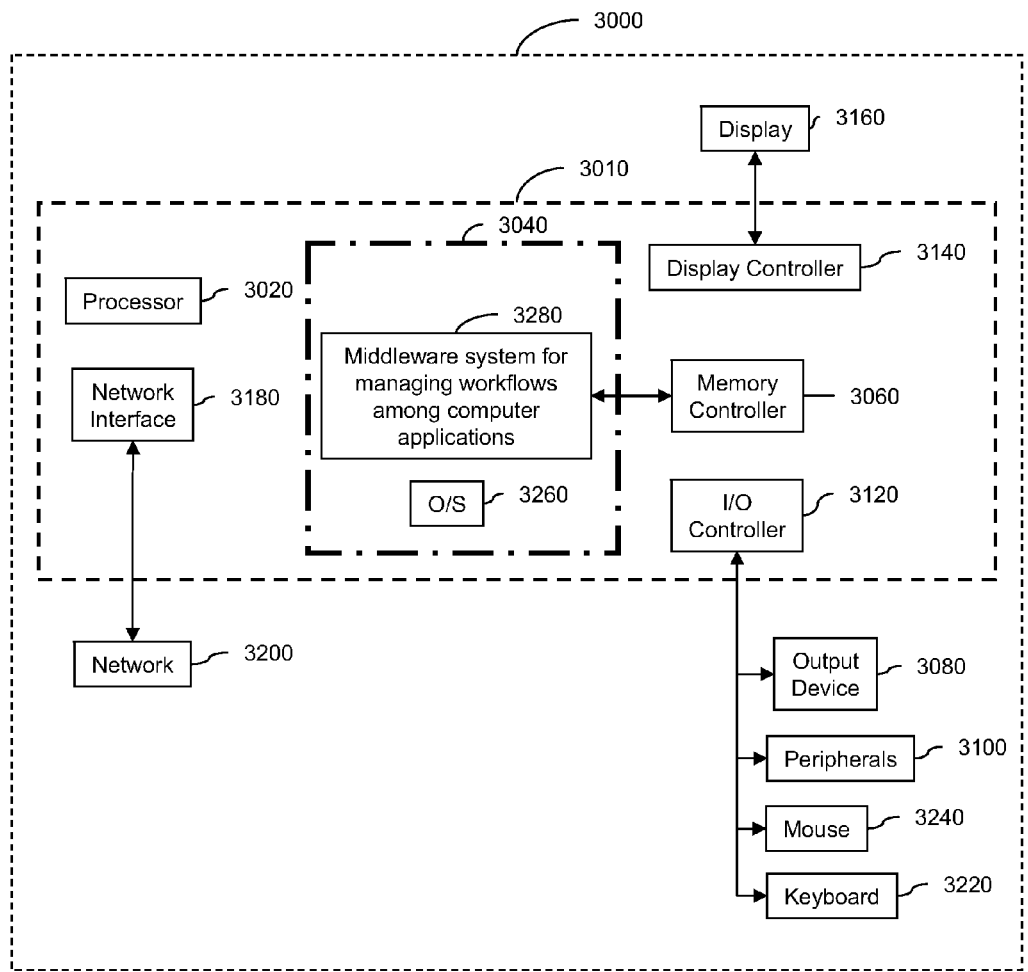
FIG. 7 is a block diagram that illustrates an exemplary computing system in which embodiments of the present invention may be implemented.

Referring to FIG. 7, a block diagram illustrates an exemplary computing system 3000 that may include the middleware system for managing workflows among computer applications 3280. The computing system 3000 includes a computer 3010. As can be appreciated, the computing system 3000 can include a variety of known computing devices, including but not limited to, a desktop computer, a laptop, a server, a portable handheld device, or other electronic devices. For ease of this discussion, this embodiment of the invention will be discussed in the context of the computer 3010.

The computer 3010 is shown to include a processor 3020, memory 3040 coupled to a memory controller 3060, one or more input and/or output (I/O) devices 3080, 3100 (or peripherals) that are communicatively coupled via a local input/output controller 3120, and a display controller 3140 coupled to a display 3160. In an exemplary embodiment, the system 3000 can further include a network interface 3180 for coupling to a network 3200. The network 3200 transmits and receives data between the computer 3010 and external systems. In an exemplary embodiment, a conventional keyboard 3220 and mouse 3240 can be coupled to the input/output controller 3120.

The memory 3040 stores instructions that can be executed by the processor 3020. The instructions stored in memory 3040 may include one or more separate programs, each of which comprises an ordered listing of executable instructions for implementing logical functions. In the example shown in FIG. 7, the instructions stored in the memory 3040 include a suitable operating system (OS) 3260 to control the execution of other computer programs and provide scheduling, input-output control, file and data management, memory management, and communication control and related services.

The processor 3020 is configured to execute the instructions stored within the memory 3040, to communicate data to and from the memory 3040, and to generally control operations of the computer 3010 pursuant to the instructions. The processor 3020 can be a custom made or generally available processor, a central processing unit (CPU), an auxiliary processor among several processors associated with the computer 3010, a semiconductor based microprocessor (in the form of a microchip or chip set), a macroprocessor, or generally any device for executing instructions.

The processor 3020 executes the instructions of the middleware system for managing workflows among computer applications 3280. In various embodiments, the system 3280 is stored in the memory 3040 (as shown), is executed from a portable storage device (e.g., CD-ROM, Diskette, FlashDrive, etc.) (not shown), and/or is run from a remote location such as from a central server (not shown).

According to still another embodiment of the present invention, a computer program product is provided for managing workflows among computer applications. The computer program product includes computer program instructions stored on a computer readable storage medium. When the instructions are executed, a computer will perform the steps of the method for managing workflows among computer applications, the steps of which are described above.

As will be appreciated by those skilled in the art, aspects of the present invention may be embodied as a system or method (as described above) or as a computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or a suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or a suitable combination of the foregoing. A computer readable storage medium may be a tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms, including, but not limited to, electro-magnetic, optical, or a suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or a suitable combination of the foregoing.

Computer program code for carrying out operations for aspects of the present invention may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A middleware system for managing workflows among computer applications, the system comprising:
   a common construct unit for retrieving a mapping between a component of a macro workflow of the middleware system and a micro workflow component of a first computer application for executing the macro workflow, wherein the mapping is a pre-defined mapping scheme stored in a database, wherein the pre-defined mapping scheme is 1:1, 1:N, or N:1, wherein N represents any number of components of a macro workflow or any number of micro workflow components, wherein the macro workflow orchestrates a plurality of micro workflows of the first computer application and a plurality of computer applications, wherein the macro workflow includes a series of steps, each step being one of the plurality of micro workflows, and wherein each of the plurality of micro workflows is performed by one of the plurality of computer applications;

a workflow export unit for generating an output that enables the common construct to execute the macro workflow by executing at least one of the plurality of micro workflows on one of the first computer applications and the plurality of computer applications;

a service manager component for:

testing an existing connection between the middleware system and at least one of the first computer applications and the plurality of computer applications;

an execution unit for executing the macro workflow on at least one of the first computer applications and the plurality of computer applications; and a monitoring unit for retrieving the status of the application software environment of the at least one of the first computer applications and the plurality of computer applications and;

obtaining the status of the execution of the micro workflow corresponding to the macro workflow.

2. The system according to claim 1, wherein generating the output is performed by: referencing the mapping; retrieving the micro workflow component of the first computer application of the plurality of computer applications that corresponds to the macro workflow component of the middleware system; and using the retrieved micro workflow component of the first computer application to generate the output.

3. The system according to claim 1, wherein the micro workflow component of the first computer application and the plurality of computer applications and the macro workflow component of the middleware system are selected from the group consisting of: a business object and a function call.

4. The system according to claim 1, wherein the output is selected from the group consisting of: a standard language file, a proprietary language file, a text file, and an API call.

5. The system according to claim 1, wherein at least one of the first computer applications and the plurality of computer applications is a middleware computer application.

6. The system according to claim 1 wherein the existing or new connection enables the middleware system to retrieve or apply the generated output.

7. The system according to claim 1, wherein obtaining the status of the execution of the macro workflow is performed by retrieving the output from a common monitoring folder of the alert engine and parsing the output to generate runtime information about the component of the micro workflow that corresponds to the macro workflow of the middleware system.

8. The system according to claim 7, wherein the alert engine further displays the generated runtime information.

9. A computer-implemented method of managing workflows among computer applications, the method comprising:

retrieving a mapping between a component of a macro workflow of the middleware system and a micro workflow component of a first computer application for executing the macro workflow, wherein the mapping is a pre-defined mapping scheme stored in a database, wherein the pre-defined mapping scheme is 1:1, 1:N, or N:1, wherein N represents any number of components of a macro workflow or any number of micro workflow components, wherein the macro workflow orchestrates a plurality of micro workflows of the first computer application and a plurality of computer applications, wherein the macro workflow includes a series of steps, each step being one of the plurality of micro workflows, and wherein each of the plurality of micro workflows is performed by one of the plurality of computer applications;

generating an output that enables the common construct to execute the macro workflow by executing at least one of the plurality of micro workflows on one of the first computer application and the plurality of computer applications;

testing an existing connection between the middleware system and at least one of the first computer applications and the plurality of computer applications;

executing the macro workflow on at least one of the first computer applications and the plurality of computer applications;

retrieving the status of the application software environment of the at least one of the first computer applications and the plurality of computer applications; and obtaining the status of the execution of the micro workflow corresponding to the macro workflow.

10. he method according to claim 9, wherein generating the output comprises:

referencing the mapping;

retrieving the micro workflow component of the first computer application of the plurality of computer applications that corresponds to the macro workflow component of the middleware system; and using the retrieved micro workflow component of the first computer application to generate the output.

11. The method according to claim 9, wherein the micro workflow component of the first computer application and the plurality of computer applications and the macro workflow component of the middleware system are selected from the group consisting of: a business object and a function call.

12. The method according to claim 9, wherein the output is selected from the group consisting of: a standard language file, a proprietary language file, a text file, and an API call.

13. The method according to claim 9, wherein at least one of the first computer applications and the plurality of computer applications is a middleware computer application.

14. The method according to claim 9, wherein the existing or new connection enables the middleware system to retrieve or apply the generated output.

15. The method according to claim 9, wherein obtaining the status of the execution of the micro workflow corresponding to the macro workflow comprises:

retrieving the output from a common monitoring folder of the middleware system; and parsing the output to generate runtime information about the component of the micro workflow that corresponds to the macro workflow of the middleware system.

16. The method according to claim 15, further comprising displaying the generated runtime information.

17. A computer program product for managing workflows among computer applications, said computer program product comprising computer program instructions that when executed by a processor carry out the steps of:

retrieving a mapping between a component of a macro workflow of the middleware system and a micro workflow component of a first computer application for executing the macro workflow, wherein the mapping is a pre-defined mapping scheme stored in a database, wherein the pre-defined mapping scheme is 1:1, 1:N, or N:1, wherein N represents any number of components of a macro workflow or any number of micro workflow components, wherein the macro workflow orchestrates a plurality of micro workflows of the first computer application and a plurality of computer applications, wherein the macro workflow includes a series of steps, each step being one of the plurality of micro workflows, and wherein each of the plurality of micro workflows is performed by one of the plurality of computer applications;

generating an output that enables the common construct to execute the macro workflow by executing at least one of the plurality of micro workflows on one of the first computer application and the plurality of computer applications;

testing an existing connection between the middleware system and at least one of the first computer applications and the plurality of computer applications;

executing the macro workflow on at least one of the first computer applications and the plurality of computer applications;

retrieving the status of the application software environment of the at least one of the first computer applications and the plurality of computer applications; and obtaining the status of the execution of the micro workflow corresponding to the macro workflow.

18. The computer program product according to claim 17, wherein generating the output is performed by: referencing the mapping; retrieving the micro workflow component of the first computer application of the plurality of computer applications that corresponds to the macro workflow component of the middleware system; and using the retrieved micro workflow component of the first computer application to generate the output.

19. The computer program product according to claim 17, wherein the existing or new connection enables the middleware system to retrieve or apply the generated output.

\* \* \* \* \*